(12) United States Patent
Morikazu et al.

(10) Patent No.: US 12,343,812 B2
(45) Date of Patent: Jul. 1, 2025

(54) LASER PROCESSING APPARATUS

(71) Applicant: DISCO CORPORATION, Tokyo (JP)

(72) Inventors: Hiroshi Morikazu, Tokyo (JP);
Naotoshi Kirihara, Tokyo (JP); Yohei Kaneko, Tokyo (JP); Kentaro Odanaka, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 148 days.

(21) Appl. No.: 18/494,263

(22) Filed: Oct. 25, 2023

(65) Prior Publication Data

US 2024/0139864 A1    May 2, 2024

(30) Foreign Application Priority Data

Oct. 31, 2022    (JP) .................. 2022-174021

(51) Int. Cl.
*B23K 26/0622* (2014.01)
*B23K 26/36* (2014.01)

(52) U.S. Cl.
CPC .......... *B23K 26/0622* (2015.10); *B23K 26/36* (2013.01)

(58) Field of Classification Search
CPC . B23K 26/0622; B23K 26/0624; B23K 26/36
See application file for complete search history.

(56) References Cited

FOREIGN PATENT DOCUMENTS

JP    2015133437 A    7/2015

*Primary Examiner* — James Sanders
(74) *Attorney, Agent, or Firm* — Greer Burns & Crain Ltd.

(57) ABSTRACT

A laser oscillation mechanism of a laser beam irradiation unit has a first mode to break growing debris, a second mode to suppress generation of molten debris, and a third mode to break the growing debris and suppress generation of the molten debris. The laser oscillation mechanism includes a selecting part that selects any of the first mode, the second mode, and the third mode. The laser oscillation mechanism sets a repetition frequency with a first group being one unit in the first mode, and sets a repetition frequency with a second group being one unit in the second mode, and sets a repetition frequency with a third group being one unit in the third mode.

4 Claims, 8 Drawing Sheets

LASER PROCESSING APPARATUS

BACKGROUND OF THE INVENTION

Field of the Invention

The present invention relates to a laser processing apparatus.

Description of the Related Art

A wafer on which multiple devices such as an integrated circuit (IC) and a large-scale integration (LSI) are formed on a front surface in such a manner as to be marked out by multiple crossing planned dividing lines is divided into individual device chips by a laser processing apparatus, and the device chips thus divided are individually used for pieces of electrical equipment such as mobile phones and personal computers.

The laser processing apparatus includes a chuck table that holds a workpiece, a laser beam irradiation unit that irradiates the workpiece held by the chuck table with a laser beam with a wavelength having absorbability, and a feed mechanism that carries out processing feed of the chuck table and the laser beam irradiation unit relatively, and can divide a wafer into individual device chips with high accuracy.

However, there is a problem that molten debris generated due to irradiation with the laser beam adheres to a device and deteriorates the quality of the device chip. Further, particularly in a wafer in which copper interconnects are stacked on a silicon substrate, there is a problem that debris arising from melting and mixing of copper and silicon with each other due to irradiation with the laser beam adheres to a device and deteriorates the quality of the device chip. This debris is likely to be generated in a workpiece that contains a semiconductor material and a metal material and is referred to as growing debris in some cases because such debris grows over time after irradiation with the laser beam.

Thus, the present applicant has developed a technique in which irradiation with a laser beam is carried out again in order to remove the molten debris and the growing debris generated at the outer circumferences of device chips (for example, refer to Japanese Patent Laid-open No. 2015-133437).

SUMMARY OF THE INVENTION

However, in the technique disclosed in Japanese Patent Laid-open No. 2015-133437, irradiation with the laser beam for removing the molten debris and the growing debris needs to be carried out after irradiation with a laser beam for forming grooves in a workpiece is carried out. Thus, there is room for improvement in the productivity.

Thus, an object of the present invention is to provide a laser processing apparatus that does not need to carry out irradiation with a laser beam anew in order to remove debris after irradiating a workpiece with a laser beam to form grooves.

In accordance with an aspect of the present invention, there is provided a laser processing apparatus including a chuck table that holds a workpiece, a laser beam irradiation unit that irradiates the workpiece held by the chuck table with a pulsed laser beam, and a feed mechanism that carries out processing feed of the chuck table and the laser beam irradiation unit relatively with each other, in which the laser beam irradiation unit includes a laser oscillation mechanism that emits the pulsed laser beam and a beam condenser that condenses the pulsed laser beam emitted by the laser oscillation mechanism and irradiates the workpiece held by the chuck table with the pulsed laser beam. The laser oscillation mechanism includes a first mode having a first group setting part that sets the number of pulsed laser beams with which irradiation with the next pulsed laser beam is carried out in a time required until plasma generated from the workpiece due to the irradiation of the workpiece with the pulsed laser beam disappears to continue the plasma without interruption and break growing debris and makes the pulsed laser beams into a first group, and a first time interval setting part that sets a time required until heat generated due to irradiation with the pulsed laser beams of the first group cools down as a time interval between the first group and the adjacent first group and sets a time interval of the pulsed laser beams that configure the first group, a second mode having a second group setting part that sets the number of pulsed laser beams with which irradiation is carried out by a time when molten debris solidifies, on condition that irradiation with the pulsed laser beam is carried out in a time shorter than a time for which the molten debris is generated due to the irradiation of the workpiece with the pulsed laser beam and makes the pulsed laser beams into a second group, and a second time interval setting part that sets a time required until heat generated due to irradiation with the pulsed laser beams of the second group cools down as a time interval between the second group and the adjacent second group and sets a time interval of the pulsed laser beams that configure the second group, a third mode having a third group setting part that sets the number of pulsed laser beams with which irradiation is carried out by the time when the molten debris solidifies, on condition that irradiation with the next pulsed laser beam is carried out in a time that is a time shorter than the time for which the molten debris is generated due to the irradiation of the workpiece with the pulsed laser beam and is the time required until the plasma generated from the workpiece due to the irradiation with the pulsed laser beam disappears to continue the plasma without interruption and break the growing debris and makes the pulsed laser beams into a third group, and a third time interval setting part that sets a time required until heat generated due to irradiation with the pulsed laser beams of the third group cools down as a time interval between the third group and the adjacent third group and sets a time interval of the pulsed laser beams that configure the third group. The laser oscillation mechanism further includes a selecting part that selects any of the first mode, the second mode, and the third mode. The laser oscillation mechanism sets a repetition frequency with the first group being one unit in the first mode. The laser oscillation mechanism sets a repetition frequency with the second group being one unit in the second mode. The laser oscillation mechanism sets a repetition frequency with the third group being one unit in the third mode.

Preferably, the laser oscillation mechanism includes a plurality of laser diodes that emit the pulsed laser beam, the first group is set by the pulsed laser beams emitted by the plurality of laser diodes in the first group setting part, the second group is set by the pulsed laser beams emitted by the plurality of laser diodes in the second group setting part, the third group is set by the pulsed laser beams emitted by the plurality of laser diodes in the third group setting part. In the first time interval setting part, a signal is input to the plurality of laser diodes at a desired time interval by a pulse delay generator, and the signal is input in such a manner that the time required until the heat generated due to the irradiation with the pulsed laser beams of the first group cools down is set as the time interval between the first group and the adjacent first group. In the second time interval setting part, a signal is input to the plurality of laser diodes at a desired time interval by the pulse delay generator, and the signal is input in such a manner that the time required until the heat generated due to the irradiation with the pulsed laser beams of the second group cools down is set as the time interval between the second group and the adjacent second group. In the third time interval setting part, a signal is input to the plurality of laser diodes at a desired time interval by the pulse delay generator, and the signal is input in such a manner that the time required until the heat generated due to the irradiation with the pulsed laser beams of the third group cools down is set as the time interval between the third group and the adjacent third group.

Preferably, the laser oscillation mechanism includes a plurality of laser oscillators that emit the pulsed laser beam. The first group is set by the pulsed laser beams emitted by the plurality of laser oscillators in the first group setting part. The second group is set by the pulsed laser beams emitted by the plurality of laser oscillators in the second group setting part. The third group is set by the pulsed laser beams emitted by the plurality of laser oscillators in the third group setting part. In the first time interval setting part, a voltage is applied to the plurality of laser oscillators at a desired time interval by a delayed voltage instrument, and the voltage is applied in such a manner that the time required until the heat generated due to the irradiation with the pulsed laser beams of the first group cools down is set as the time interval between the first group and the adjacent first group. In the second time interval setting part, a voltage is applied to the plurality of laser oscillators at a desired time interval by the delayed voltage instrument, and the voltage is applied in such a manner that the time required until the heat generated due to the irradiation with the pulsed laser beams of the second group cools down is set as the time interval between the second group and the adjacent second group. In the third time interval setting part, a voltage is applied to the plurality of laser oscillators at a desired time interval by the delayed voltage instrument, and the voltage is applied in such a manner that the time required until the heat generated due to the irradiation with the pulsed laser beams of the third group cools down is set as the time interval between the third group and the adjacent third group.

Preferably, a repetition frequency is set by decimating a predetermined number of the first groups from a plurality of the first groups emitted in one second in the first mode. A repetition frequency is set by decimating a predetermined number of the second groups from a plurality of the second groups emitted in one second in the second mode. A repetition frequency is set by decimating a predetermined number of the third groups from a plurality of the third groups emitted in one second in the third mode.

According to the present invention, by selecting the first mode, the irradiation with the laser beam for forming a groove in the workpiece and the irradiation with the laser beam for breaking the growing debris can simultaneously be carried out. Further, when the second mode is selected, the irradiation with the laser beam for forming the groove in the workpiece and the irradiation with the laser beam for suppressing generation of the molten debris can simultaneously be carried out. Moreover, when the third mode is selected, the irradiation with the laser beam for forming the groove in the workpiece and the irradiation with the laser beam for breaking the growing debris and suppressing generation of the molten debris can simultaneously be carried out. Therefore, irradiation with the laser beam does not need to be carried out anew in order to remove the debris after the workpiece is irradiated with the laser beam to form the groove. Thus, the productivity can be improved.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A laser processing apparatus according to an embodiment of the present invention will be described below with reference to the drawings. The laser processing apparatus indicated by numeral 2 as a whole in FIG. 1 includes a holding unit 4 that holds a workpiece such as a wafer, a laser beam irradiation unit 6 that irradiates the workpiece held by the holding unit 4 with a laser beam, and a feed mechanism 8 that carries out processing feed of the holding unit 4 and the laser beam irradiation unit 6 relatively.

Figure 1:
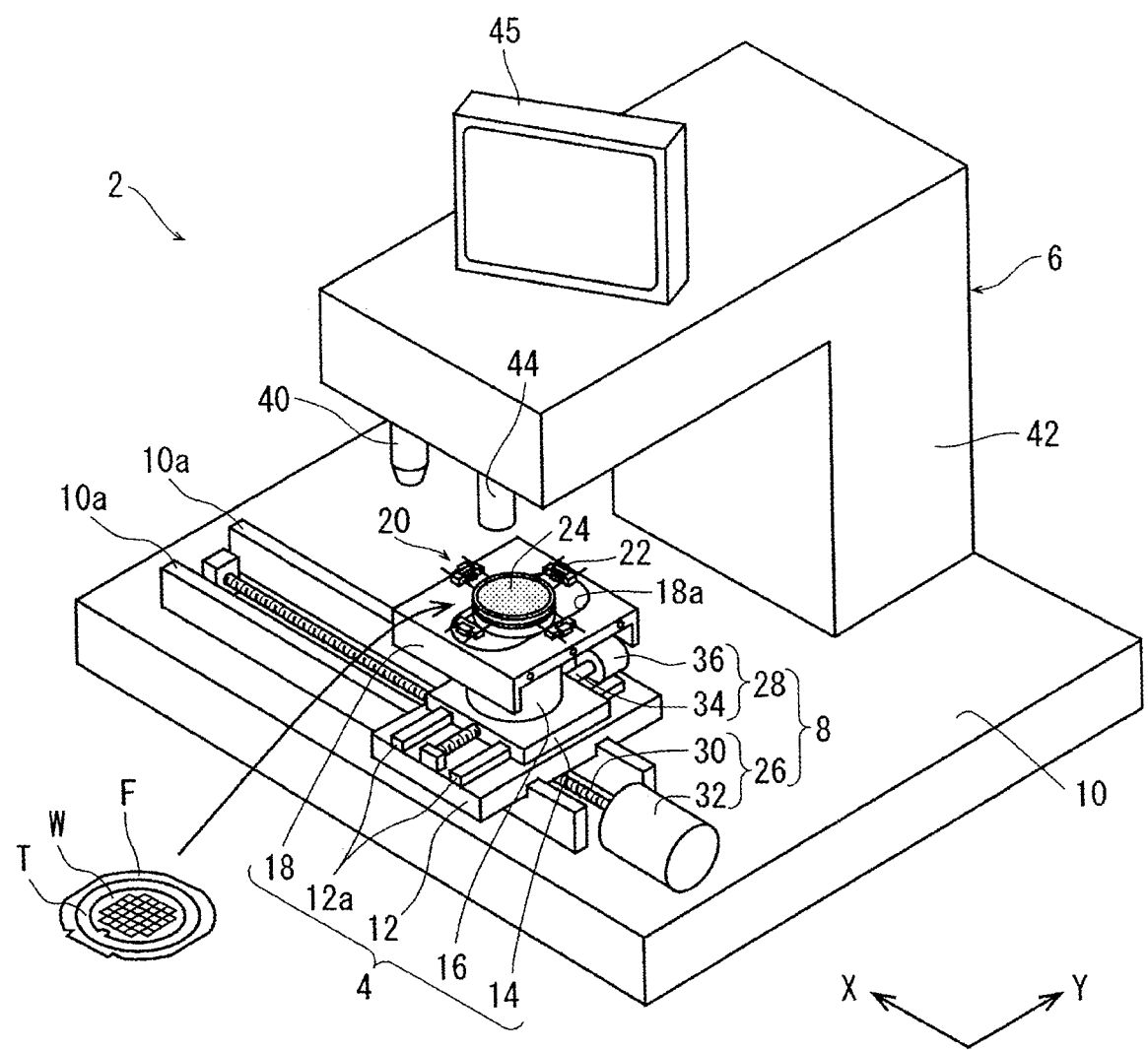
FIG. 1 is a perspective view of a laser processing apparatus of an embodiment of the present invention.

As illustrated in FIG. 1, the holding unit 4 includes an X-axis movable plate 12 supported by an upper surface of a base 10 movably in an X-axis direction, a Y-axis movable plate 14 supported by an upper surface of the X-axis movable plate 12 movably in a Y-axis direction, a support column 16 fixed to an upper surface of the Y-axis movable plate 14, and a cover plate 18 mounted on an upper end of the support column 16. A long hole 18a extending in the Y-axis direction is formed in the cover plate 18, and a chuck table 20 that passes through the long hole 18a and extends upward is rotatably mounted on the upper end of the support column 16. At a circumferential edge of the chuck table 20, multiple clamps 22 are disposed at intervals in the circumferential direction.

A porous circular suction chuck 24 connected to suction means (not illustrated) is disposed at an upper end part of the chuck table 20. In the holding unit 4, a suction force is generated for an upper surface of the suction chuck 24 by the suction means to suck and hold the workpiece. Further, the chuck table 20 is allowed to be rotated by a motor (not illustrated) incorporated in the support column 16 with the upward-downward direction being the axial center.

The X-axis direction is a direction indicated by an arrow X in FIG. 1, and the Y-axis direction is a direction indicated by an arrow Y in FIG. 1 and is a direction orthogonal to the X-axis direction. The XY-plane defined by the X-axis direction and the Y-axis direction is substantially horizontal.

The feed mechanism 8 of the present embodiment includes an X-axis feed mechanism 26 that carries out processing feed of the chuck table 20 in the X-axis direction and a Y-axis feed mechanism 28 that carries out indexing feed of the chuck table 20 in the Y-axis direction.

The X-axis feed mechanism 26 has a ball screw 30 that is coupled to the X-axis movable plate 12 and extends in the X-axis direction and a motor 32 that rotates the ball screw 30. The X-axis feed mechanism 26 converts rotational motion of the motor 32 to linear motion by the ball screw 30 and transmits the linear motion to the X-axis movable plate 12 to move the X-axis movable plate 12 in the X-axis direction along guide rails 10a on the base 10. This causes processing feed of the chuck table 20 in the X-axis direction.

The Y-axis feed mechanism 28 has a ball screw 34 that is coupled to the Y-axis movable plate 14 and extends in the Y-axis direction, and a motor 36 that rotates the ball screw 34. The Y-axis feed mechanism 28 converts rotational motion of the motor 36 to linear motion by the ball screw 34 and transmits the linear motion to the Y-axis movable plate 14 to move the Y-axis movable plate 14 in the Y-axis direction along guide rails 12a on the X-axis movable plate 12. This causes indexing feed of the chuck table 20 in the Y-axis direction.

Figure 2:
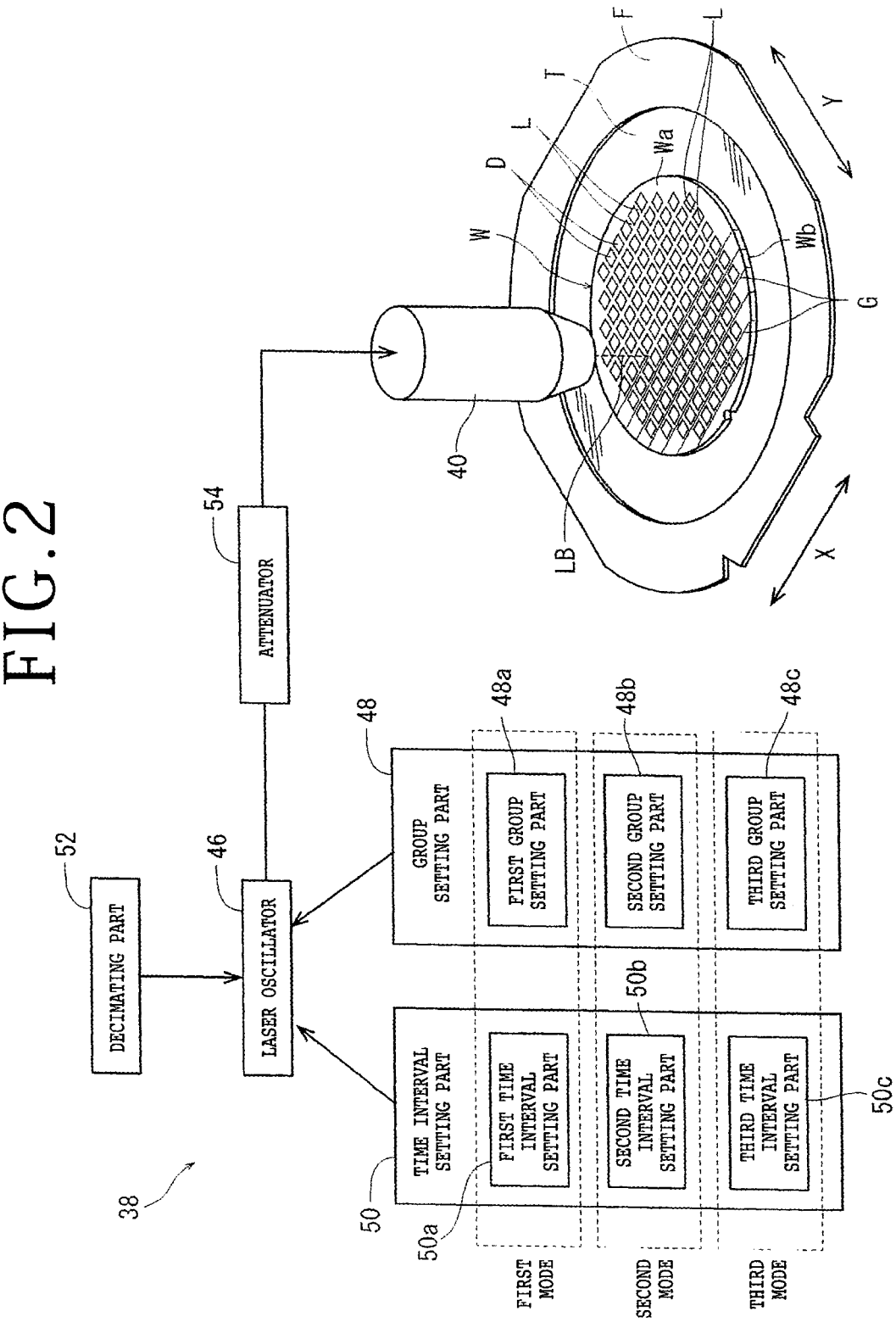
FIG. 2 is a block diagram of the laser processing apparatus illustrated in FIG. 1.

Referring to FIG. 1 and FIG. 2, the laser beam irradiation unit 6 includes a laser oscillation mechanism 38 (see FIG. 2) that emits a pulsed laser beam, and a beam condenser 40 that condenses the pulsed laser beam emitted by the laser oscillation mechanism 38 and irradiates the workpiece held by the holding unit 4 with the pulsed laser beam.

As illustrated in FIG. 1, the laser beam irradiation unit 6 has a housing 42 that extends upward from the upper surface of the base 10 and subsequently extends substantially horizontally. The above-described laser oscillation mechanism 38 is housed inside the housing 42, and the above-described beam condenser 40 is mounted on a lower surface of a tip of the housing 42. Further, an imaging unit 44 for imaging the workpiece held by the holding unit 4 is annexed on the lower surface of the tip of the housing 42, and a display unit 45 that displays an image obtained by imaging by the imaging unit 44 is disposed on an upper surface of the housing 42.

As illustrated in FIG. 2, the laser oscillation mechanism 38 includes a laser oscillator 46 that emits the pulsed laser beam with a wavelength having absorbability with respect to the workpiece, a group setting part 48, a time interval setting part 50, and an attenuator 54 that adjusts output power of the pulsed laser beam emitted by the laser oscillator 46.

Figure 3:
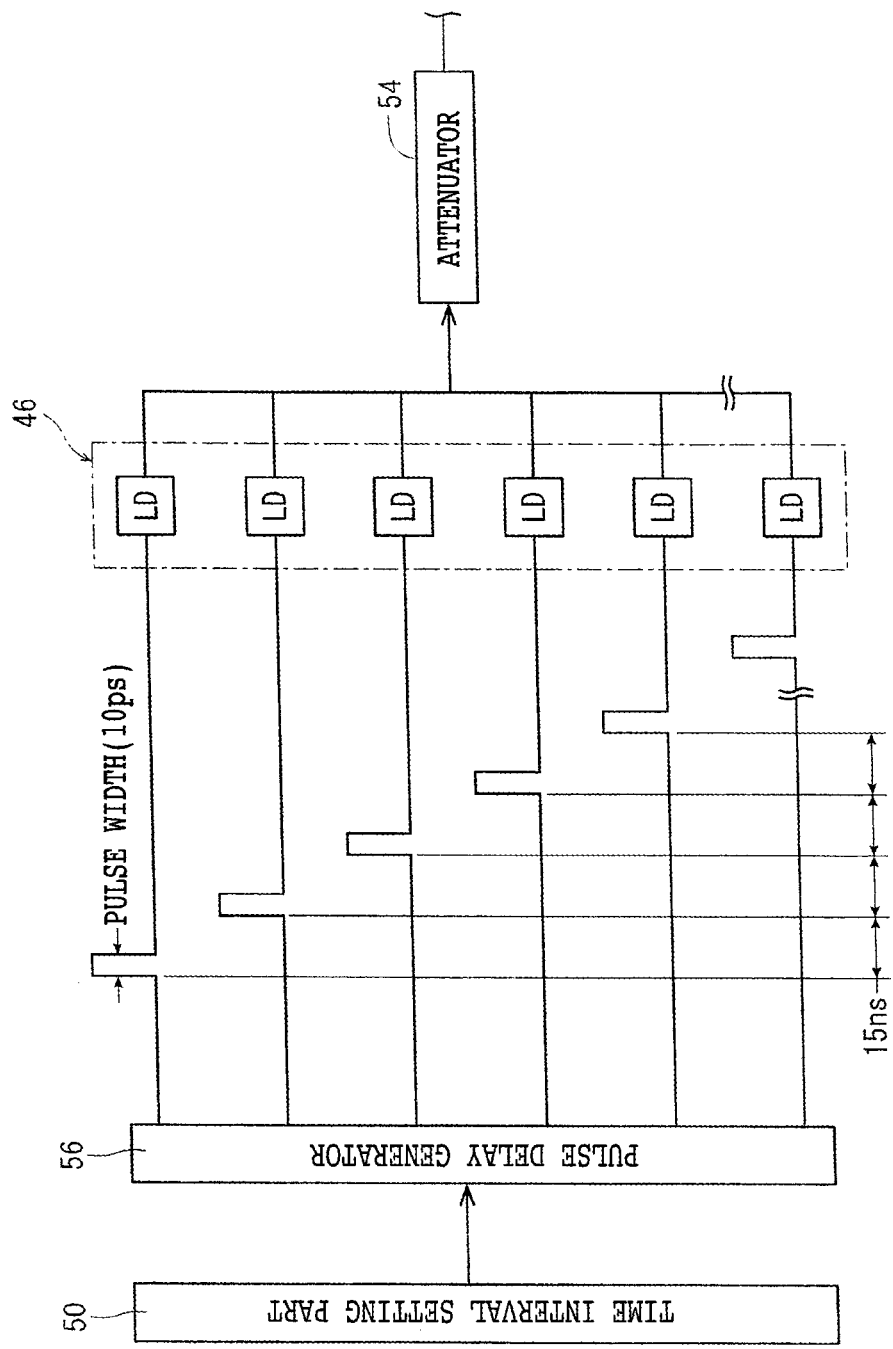
FIG. 3 is a schematic diagram of a laser oscillation mechanism illustrated in FIG. 2.
Figure 4:
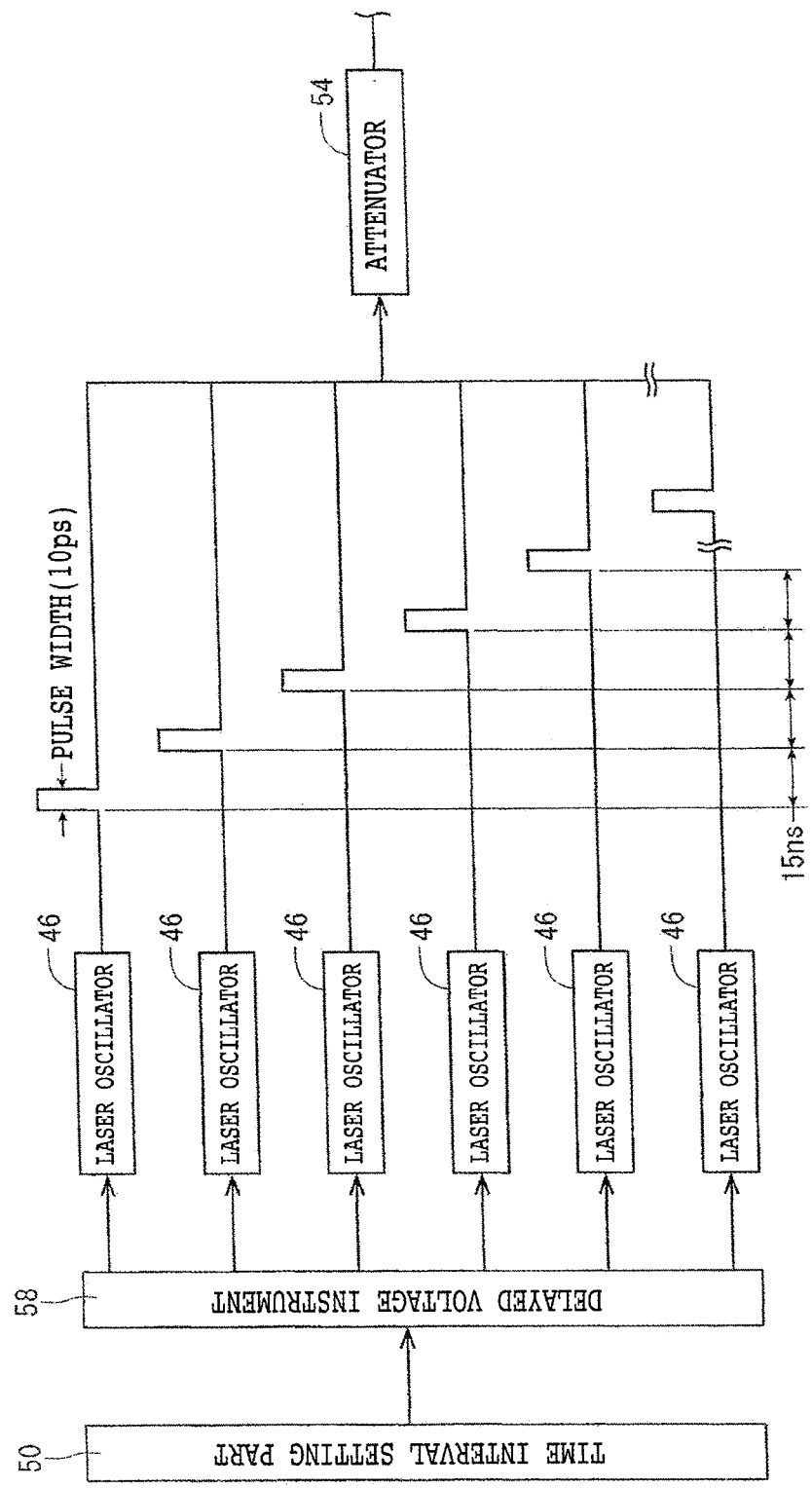
FIG. 4 is a schematic diagram of the laser oscillation mechanism with another form.

In FIG. 2, one box indicating the laser oscillator 46 is illustrated. However, the number of the laser oscillator 46 disposed in the laser oscillation mechanism 38 may be one or more. When one laser oscillator 46 is disposed, the one laser oscillator 46 can include multiple laser diodes LD as illustrated in FIG. 3, for example. Moreover, as illustrated in FIG. 4, multiple laser oscillators 46 may be disposed in the laser oscillation mechanism 38. The medium of the laser is not limited to a semiconductor, and another publicly-known medium (for example, gas) can be employed.

As illustrated in FIG. 2, the group setting part 48 of the present embodiment includes a first group setting part 48a, a second group setting part 48b, and a third group setting part 48c.

The first group setting part 48a sets the number of pulsed laser beams with which irradiation with the next pulsed laser beam is carried out in the time until plasma generated from the workpiece due to irradiation of the workpiece with the pulsed laser beam disappears to continue the plasma without interruption and break the growing debris, and makes the pulsed laser beams into a first group.

In general, the plasma generated when the workpiece is irradiated with the pulsed laser beam is generated after the elapse of substantially 10 ns from the irradiation of the workpiece with the pulsed laser beam and disappears after the elapse of substantially 30 ns from the irradiation of the workpiece with the pulsed laser beam. Thus, as one example of the above-described "time required until plasma generated from the workpiece due to irradiation of the workpiece with the pulsed laser beam disappears," a time period for which substantially 30 ns elapses from the irradiation with the pulsed laser beam is cited.

Next, continuing the plasma without interruption will be described with reference to FIG. 5. According to the above-described example, with the time when the workpiece is irradiated with a first pulsed laser beam LB1 (first pulse) being the basis (0 s), plasma P1 relating to the first pulse is generated after 10 ns, and the plasma P1 disappears after 30 ns.

In this case, for example, when irradiation with a second pulsed laser beam LB2 (second pulse) is carried out after 15 ns as a timing in the time (30 ns) until the plasma P1 relating to the irradiation with the first pulse disappears, plasma P2 relating to the irradiation with the second pulse is generated after 25 ns from the irradiation with the first pulse and disappears after 45 ns. That is, the plasma P2 is generated before the plasma P1 disappears. Similarly, when the time interval between the second pulse and a third pulse is also set to 15 ns, plasma P3 relating to a third pulsed laser beam LB3 (third pulse) is generated before the plasma P2 disappears.

As above, by carrying out irradiation with the next pulsed laser beam in the time required until the plasma generated from the workpiece due to the irradiation of the workpiece with the pulsed laser beam disappears (in the above-described example, setting the time interval of the pulsed laser beams to 15 ns), the plasma generated from the workpiece can be continued without being interrupted. This can break the growing debris generated due to the irradiation with the pulsed laser beam by the plasma. Further, for example, six (six pulses) is sufficient as the number of pulsed laser beams for breaking the growing debris.

"In the time required until plasma generated from the workpiece due to irradiation of the workpiece with the pulsed laser beam disappears" is not limited to the time after 15 ns from the irradiation with the pulsed laser beam.

In the example illustrated in FIG. 3, the first group setting part 48a can set the first group by the pulsed laser beams emitted by multiple (for example, six) laser diodes LD. The first group setting part 48a may set the first group by the pulsed laser beams emitted by some of the laser diodes LD (for example, six in the ten laser diodes LD) included in the laser oscillator 46.

Further, in the example illustrated in FIG. 4, it is also possible for the first group setting part 48a to set the first group by the pulsed laser beams emitted by multiple laser oscillators 46. The first group setting part 48a may set the first group by the pulsed laser beams emitted by some of the laser oscillators 46 disposed in the laser oscillation mechanism 38.

In the present specification, in the debris generated in the workpiece due to irradiation with the pulsed laser beam, debris that grows over time (gradually becomes larger after generation) is referred to as the growing debris, and debris that does not grow over time in contrast thereto is referred to as the molten debris.

The second group setting part 48b sets the number of pulsed laser beams with which irradiation is carried out by the time when the molten debris solidifies, on condition that irradiation with the pulsed laser beam is carried out in a time shorter than the time for which the molten debris is generated due to the irradiation of the workpiece with the pulsed laser beam, and makes the pulsed laser beams into a second group.

It has been confirmed by the present applicant that the molten debris generated when the workpiece is irradiated with the pulsed laser beam is generated after the elapse of substantially 100 ns from the irradiation of the workpiece with the pulsed laser beam and solidifies after the elapse of substantially 500 ns from the irradiation of the workpiece with the pulsed laser beam.

Thus, in the second group setting part 48b, the number of pulsed laser beams to be irradiated in the time required until 500 ns elapses from irradiation with the first pulsed laser beam (first pulse) is set on condition that irradiation with the pulsed laser beam is carried out at a time interval (pulse interval) shorter than 100 ns, and the pulsed laser beams are made into the second group. By setting the number of pulsed laser beams of the second group in this manner, generation of the molten debris can be suppressed when the workpiece is irradiated with the pulsed laser beams.

Also in the second group setting part 48b, the second group can be set by the pulsed laser beams emitted by the multiple laser diodes LD or the multiple laser oscillators 46, as in the first group setting part 48a.

The third group setting part 48c sets the number of pulsed laser beams with which irradiation is carried out by the time when the molten debris solidifies, on condition that irradiation with the next pulsed laser beam is carried out in the time that is a time shorter than the time for which the molten debris is generated due to the irradiation of the workpiece with the pulsed laser beam and is the time required until plasma generated from the workpiece due to the irradiation with the pulsed laser beam disappears to continue the plasma without interruption and break the growing debris, and makes the pulsed laser beams into a third group.

As described above, it is known that the molten debris generated when the workpiece is irradiated with the pulsed laser beam is generated after the elapse of substantially 100 ns from the irradiation with the pulsed laser beam and the plasma generated when the workpiece is irradiated with the pulsed laser beam disappears after the elapse of substantially 30 ns from the irradiation with the pulsed laser beam.

Thus, it can be said that the above-described "in the time that is a time shorter than the time for which the molten debris is generated due to the irradiation of the workpiece with the pulsed laser beam and is a time required until plasma generated from the workpiece due to the irradiation with the pulsed laser beam disappears" is a time that is a time shorter than 100 ns from the irradiation with the pulsed laser beam and is shorter than a time of substantially 30 ns from the irradiation with the pulsed laser beam (for example, 15 ns).

Moreover, the molten debris solidifies after the elapse of substantially 500 ns from irradiation of the workpiece with the pulsed laser beam as described above. Thus, in the third group setting part 48c, the number of pulsed laser beams with which irradiation is carried out by the time 500 ns elapses from irradiation with the first pulsed laser beam (first pulse) is set on condition that the plasma generated due to the irradiation of the workpiece with the pulsed laser beam is continued without being interrupted to break the growing debris, and the pulsed laser beams are made into the third group. Specifically, when the pulse interval is 15 ns as in the above-described example, the number of pulsed laser beams of the third group can be set to 34 (34 pulses).

By setting the number of pulsed laser beams of the third group in this manner, when the workpiece is irradiated with the pulsed laser beams, the growing debris generated due to the irradiation with the pulsed laser beam can be broken by the plasma, and generation of the molten debris can be suppressed.

Also in the third group setting part 48c, the third group can be set by the pulsed laser beams emitted by the multiple laser diodes LD or the multiple laser oscillators 46, as in the first and second group setting parts 48a and 48b.

As illustrated in FIG. 2, the time interval setting part 50 of the present embodiment includes a first time interval setting part 50a, a second time interval setting part 50b, and a third time interval setting part 50c.

The first time interval setting part 50a sets the time required until heat generated in the workpiece due to irradiation with the pulsed laser beams of the first group cools down as the time interval between the first group and the first group adjacent thereto, and sets the time interval of the pulsed laser beams that configure the first group.

Figure 6:
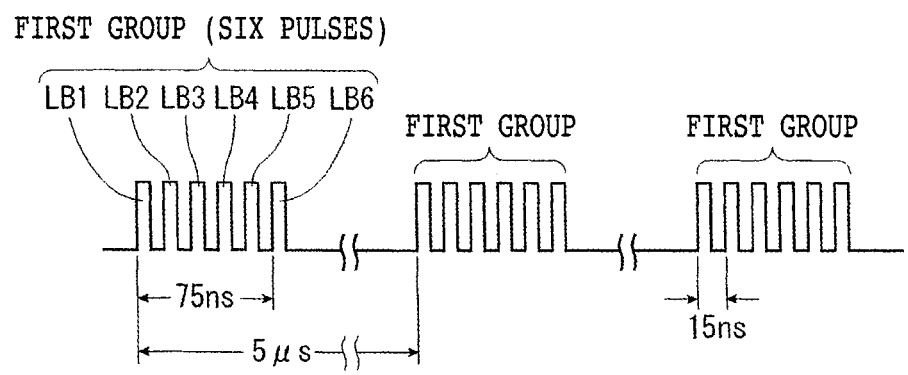
FIG. 6 is a schematic diagram of the pulsed laser beams with which a workpiece is irradiated in a first mode.

In the workpiece formed from a semiconductor material such as silicon, it is known that, at the elapse of substantially 5 μs from irradiation with the pulsed laser beams, heat generated in the workpiece due to the irradiation with the pulsed laser beams cools down and the temperature of the workpiece lowers to a temperature almost equivalent to that before the irradiation with the pulsed laser beams. Thus, as illustrated in FIG. 6, the first time interval setting part 50a sets the time interval between the first group and the adjacent first group to 5 μs or longer.

Due to this, the heat generated in the workpiece cools down in the period from the irradiation of the workpiece with the pulsed laser beams of the first group to the irradiation with the pulsed laser beams of the next first group. Therefore, quality lowering of the devices due to the heat can be prevented.

Further, the first time interval setting part 50a sets the time interval (pulse interval) of the pulsed laser beams that configure the first group. Moreover, in the case illustrated in FIG. 3, the first time interval setting part 50a inputs a signal to the multiple laser diodes LD at a desired time interval (in the illustrated example, 15 ns) by a pulse delay generator 56, and inputs the signal in such a manner that the time required until the heat generated in the workpiece due to irradiation with the pulsed laser beams of the first group cools down is set as the time interval between the first group and the adjacent first group (in the above-described example, 5 μs). A freely selected value (for example, 10 ps) can be employed as the pulse width of the signal input from the pulse delay generator 56 to each laser diode LD.

On the other hand, in the case illustrated in FIG. 4, the first time interval setting part 50a applies a voltage to the multiple laser oscillators 46 at a desired time interval by a delayed voltage instrument 58, and applies the voltage in such a manner that the time required until the heat generated in the workpiece due to irradiation with the pulsed laser beams of the first group cools down is set as the time interval between the first group and the first group adjacent. The pulse width of the pulsed laser beam emitted by each laser oscillator 46 due to the application of the voltage from the delayed voltage instrument 58 to each laser oscillator 46 may be a freely selected value.

When the signal is input to the multiple laser diodes LD by the pulse delay generator 56 or the voltage is applied to the multiple laser oscillators 46 by the delayed voltage instrument 58 as described above, such pulsed laser beams that the first groups (for example, six pulses) have a predetermined time interval (in the illustrated example, 5 μs) like ones illustrated in FIG. 6 are generated. That is, the repetition frequency of the pulsed laser beams is set with the first group (six pulses) being one unit. When the time interval between the first groups is 5 μs as in the illustrated example, the repetition frequency is 200 kHz.

Further, the output power of the pulsed laser beams of which the first groups have the predetermined time interval is adjusted by the attenuator 54. Thereafter, the pulsed laser beams are focused by the beam condenser 40, and the workpiece is irradiated with them. Light guide means such as an optical fiber is disposed between the laser oscillator 46 and the attenuator 54, and the pulsed laser beams of the first group are guided from the laser oscillator 46 to the attenuator 54.

Regarding the time interval between the first groups (in the illustrated example, 5 μs), although it may be set by the first time interval setting part 50*a* as described above, it may be set by a decimating part 52 (see FIG. 2) that decimates a predetermined number of first groups from multiple first groups emitted by the laser oscillator 46 in one second. The decimating part 52 can be configured from an acousto-optical element or electro-optical element.

That is, the first group is set by the pulsed laser beams emitted from the multiple laser diodes LD in the example illustrated in FIG. 3 or the multiple laser oscillators 46 in the example illustrated in FIG. 4. Moreover, in both of the examples illustrated in FIG. 3 and FIG. 4, the pulsed laser beams about which the first groups have the predetermined time interval can be generated through decimating, by the decimating part 52, the predetermined number of first groups from multiple first groups emitted in one second by the multiple laser diodes LD or the multiple laser oscillators 46 with the first group being one unit.

The second time interval setting part 50*b* sets the time required until heat generated in the workpiece due to irradiation with the pulsed laser beams of the second group cools down as the time interval between the second group and the adjacent second group (for example, 5 μs), and sets the time interval of the pulsed laser beams that configure the second group (for example, 50 ns), as in the first time interval setting part 50*a*.

Further, the second time interval setting part 50*b* inputs a signal to the multiple laser diodes LD at a desired time interval (in the above-described example, 50 ns) by the pulse delay generator 56, and inputs the signal in such a manner that the time required until the heat generated in the workpiece due to irradiation with the pulsed laser beams of the second group cools down is set as the time interval between the second group and the adjacent second group (in the above-described example, 5 μs). A freely selected value (for example, 10 ps) can be employed as the pulse width of the signal input from the pulse delay generator 56 to each laser diode LD.

Alternatively, the second time interval setting part 50*b* applies a voltage to the multiple laser oscillators 46 at a desired time interval (in the above-described example, 50 ns) by the delayed voltage instrument 58, and applies the voltage in such a manner that the time required until the heat generated in the workpiece due to irradiation with the pulsed laser beams of the second group cools down is set as the time interval between the second group and the adjacent second group. The pulse width of the pulsed laser beam emitted by each laser oscillator 46 due to the application of the voltage from the delayed voltage instrument 58 to each laser oscillator 46 may be a freely selected value.

Figure 7:
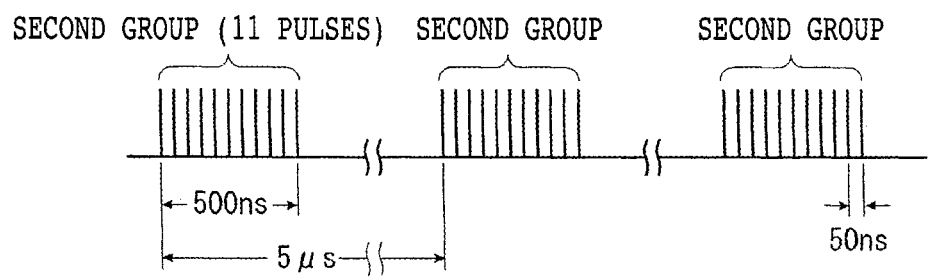
FIG. 7 is a schematic diagram of the pulsed laser beams with which the workpiece is irradiated in a second mode.

When the signal is input to the multiple laser diodes LD by the pulse delay generator 56 or the voltage is applied to the multiple laser oscillators 46 by the delayed voltage instrument 58, pulsed laser beams of which the second groups (for example, 11 pulses) have a predetermined time interval (in the illustrated example, 5 μs) like ones illustrated in FIG. 7 are generated. That is, the repetition frequency of the pulsed laser beams is set with the second group (11 pulses) being one unit. The time interval between the second groups may be set by the decimating part 52, similarly to the time interval between the first groups.

Moreover, the output power of the pulsed laser beams of which the second groups have the predetermined time interval is adjusted by the attenuator 54. Thereafter, the pulsed laser beams are focused by the beam condenser 40, and the workpiece is irradiated with them.

The third time interval setting part 50*c* sets the time required until heat generated in the workpiece due to irradiation with the pulsed laser beams of the third group cools down as the time interval between the third group and the adjacent third group (for example, 5 μs), and sets the time interval of the pulsed laser beams that configure the third group (for example, 15 ns), as in the first and second time interval setting parts 50*a* and 50*b*.

Further, the third time interval setting part 50*c* inputs a signal to the multiple laser diodes LD at a desired time interval (in the above-described example, 15 ns) by the pulse delay generator 56, and inputs the signal in such a manner that the time required until the heat generated in the workpiece due to irradiation with the pulsed laser beams of the third group cools down is set as the time interval between the third group and the adjacent third group (in the above-described example, 5 μs). A freely selected value (for example, 10 ps) can be employed as the pulse width of the signal input from the pulse delay generator 56 to each laser diode LD.

Alternatively, the third time interval setting part 50*c* applies a voltage to the multiple laser oscillators 46 at a desired time interval (in the above-described example, 15 ns) by the delayed voltage instrument 58, and applies the voltage in such a manner that the time required until the heat generated in the workpiece due to irradiation with the pulsed laser beams of the third group cools down is set as the time interval between the third group and the adjacent third group. The pulse width of the pulsed laser beam emitted by each laser oscillator 46 due to the application of the voltage from the delayed voltage instrument 58 to each laser oscillator 46 may be a freely selected value.

Figure 8:
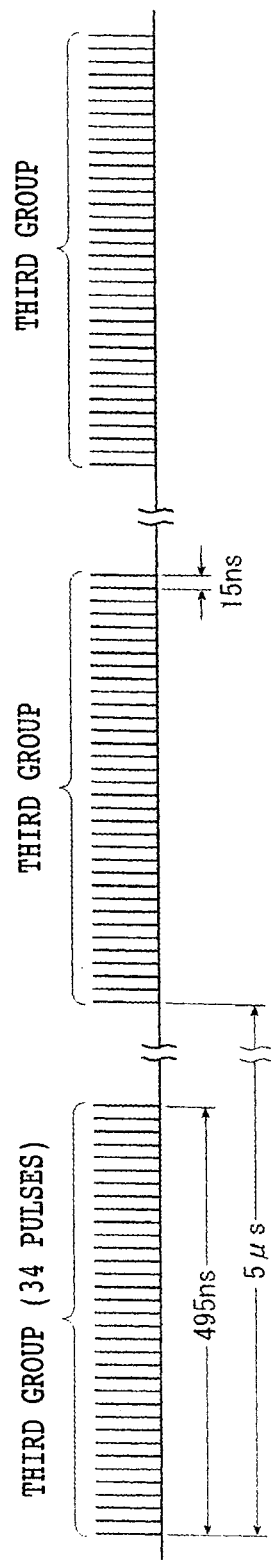
FIG. 8 is a schematic diagram of the pulsed laser beams with which the workpiece is irradiated in a third mode.

When the signal is input to the multiple laser diodes LD by the pulse delay generator 56 or the voltage is applied to the multiple laser oscillators 46 by the delayed voltage instrument 58, pulsed laser beams of which the third groups (for example, 34 pulses) have a predetermined time interval (in the illustrated example, 5 μs) like ones illustrated in FIG. 8 are generated. That is, the repetition frequency of the pulsed laser beams is set with the third group (34 pulses) being one unit. The time interval between the third groups may be set by the decimating part 52, similarly to the time intervals between the first groups and between the second groups.

Moreover, the output power of the pulsed laser beams of which the third groups have the predetermined time interval is adjusted by the attenuator 54. Thereafter, the pulsed laser beams are focused by the beam condenser 40, and the workpiece is irradiated with them.

Referring to FIG. 2, the laser oscillation mechanism 38 has, as operation modes, three kinds of modes, a first mode for removing the growing debris, a second mode for removing the molten debris, and a third mode for removing the growing debris and the molten debris. As indicated by dotted lines in FIG. 2, the first mode is a mode including the first group setting part 48a and the first time interval setting part 50a. Further, the second mode is a mode including the second group setting part 48b and the second time interval setting part 50b, and the third mode is a mode including the third group setting part 48c and the third time interval setting part 50c.

Figure 9:
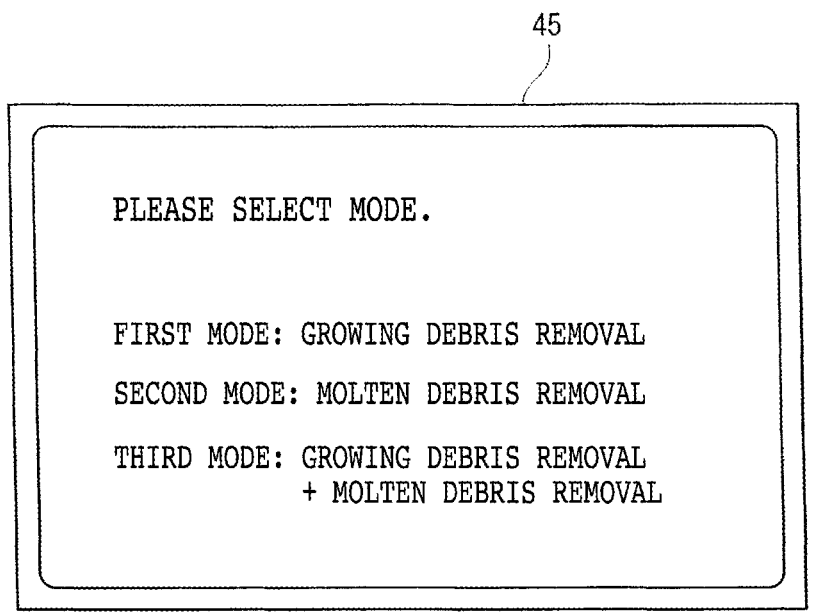
FIG. 9 is a schematic diagram of a display unit on which a screen that prompts selection of any of the first, second, and third modes is displayed.

Further, the laser oscillation mechanism 38 includes selecting means (not illustrated) that selects any of the first to third modes. For example, the selecting means causes an operator to select any of the first to third modes by displaying a screen like one illustrated in FIG. 9 on the display unit 45, and causes the laser oscillation mechanism 38 to be actuated in the mode selected by the operator.

Moreover, the laser oscillation mechanism 38 sets the repetition frequency with the first group being one unit in the first mode, and sets the repetition frequency with the second group being one unit in the second mode, and sets the repetition frequency with the third group being one unit in the third mode.

In FIG. 2, a wafer W as the workpiece for which processing can be carried out by the laser processing apparatus 2 is also illustrated. The wafer W with a circular plate shape can be formed from an appropriate semiconductor material such as silicon, for example. A front surface Wa of the wafer W is segmented into multiple rectangular regions by planned dividing lines L in a lattice manner and a device D such as an IC or an LSI is formed in each of the multiple rectangular regions. The front surface Wa of the wafer W is coated with a metal film of copper or the like, although illustration thereof is not made.

In the present embodiment, a back surface Wb of the wafer W is stuck to an adhesive tape T fixed to an annular frame F. However, the front surface Wa of the wafer W may be stuck to the adhesive tape T.

Next, a method in which grooves are formed in the wafer W as the workpiece by use of the above-described laser processing apparatus will be described.

In the present embodiment, first, the front surface Wa of the wafer W is oriented upward, and the wafer W is sucked and held by an upper surface of the chuck table 20. Further, the annular frame F is fixed by the clamps 22. Subsequently, the wafer W is imaged by the imaging unit 44, and the planned dividing lines L extending in a first direction are aligned with the X-axis direction on the basis of an image of the wafer W imaged by the imaging unit 44. Moreover, the aim of the pulsed laser beam is taken at the planned dividing line L aligned with the X-axis direction, and the height of the focal point of the pulsed laser beam is adjusted to the front surface Wa of the wafer W.

Next, while processing feed of the chuck table 20 is carried out in the X-axis direction, the wafer W is irradiated with a pulsed laser beam LB with a wavelength having absorbability with respect to the wafer W from the beam condenser 40, and ablation processing is carried out along the planned dividing line L. This forms a groove G (see FIG. 2) that cuts the planned dividing line L.

Subsequently, indexing feed of the chuck table 20 is carried out in the Y-axis direction relative to the beam condenser 40 by a distance equal to the interval of the planned dividing lines L in the Y-axis direction. Further, by alternately repeating the irradiation with the pulsed laser beam and the indexing feed, the grooves G are formed in all of the planned dividing lines L aligned with the X-axis direction.

Moreover, after the chuck table 20 is rotated by 90 degrees, the irradiation with the pulsed laser beam and the indexing feed are alternately repeated. Thereby, the grooves G are formed in all of the planned dividing lines L extending in a second direction orthogonal to the planned dividing lines L in which the grooves G have been formed previously. By carrying out the groove forming step in this manner, the grooves G are formed in a lattice manner along the planned dividing lines L in a lattice manner. This can divide the wafer W into individual device chips.

When the grooves G are formed in the workpiece such as the wafer W in the above-described manner, a processing condition according to the workpiece is set as appropriate in order to eliminate the need to carry out irradiation with a laser beam for removing debris anew.

First Mode

With the workpiece in which a comparatively large amount of growing debris is generated when the workpiece is irradiated with the laser beam (for example, a workpiece containing a semiconductor material and a metal material), the first mode is selected, and the grooves G are formed while the growing debris is broken.

When the first mode is selected, the first group setting part 48a sets the number of pulsed laser beams of the first group with which irradiation with the next pulsed laser beam is carried out in the time required until plasma generated from the workpiece due to irradiation of the workpiece with the pulsed laser beam disappears to continue the plasma without interruption and break the growing debris. Further, the first time interval setting part 50a sets the time required until heat generated in the workpiece due to irradiation with the pulsed laser beams of the first group cools down as the time interval between the first group and the adjacent first group, and sets the time interval of the pulsed laser beams that configure the first group.

As described above, in general, the plasma generated when the workpiece is irradiated with the pulsed laser beam is generated after the elapse of substantially 10 ns from the irradiation of the workpiece with the pulsed laser beam and disappears after the elapse of substantially 30 ns.

Thus, the first time interval setting part 50a sets the time interval between the first pulse and the second pulse to, for example, 15 ns. In this case, as illustrated in FIG. 5, the plasma P2 relating to the irradiation with the second pulse is generated after 25 ns from the irradiation with the first pulse and disappears after 45 ns. That is, the plasma P2 is generated before the plasma P1 disappears. Similarly, when the time interval between the second pulse and the third pulse is also set to 15 ns, the plasma P3 relating to the third pulsed laser beam LB3 (third pulse) is generated before the plasma P2 disappears.

As a result, the plasma continues without interruption while the workpiece is irradiated with the pulsed laser beams of the first group. Therefore, the growing debris generated due to the irradiation with the pulsed laser beam can surely be broken by the plasma.

In the first time interval setting part 50*a*, not only setting the time interval of the pulsed laser beams that configure the first group (in the above-described example, 15 ns) as described above but also setting the time required until the heat generated in the workpiece due to irradiation with the pulsed laser beams of the first group cools down as the time interval between the first group and the adjacent first group is carried out. This is because, when the workpiece continues to be irradiated with the pulsed laser beams, it is concerned that a hot spot is generated in the workpiece and an adverse effect on the device (quality lowering of the device) attributed to heat is caused.

As described above, it is known that, in a workpiece formed of a semiconductor material such as silicon, when substantially 5 μs has elapsed from irradiation with the pulsed laser beams, heat generated in the workpiece due to the irradiation with the pulsed laser beams cools down, and the temperature of the workpiece lowers to almost the same temperature as that before the irradiation with the pulsed laser beams. Thus, as illustrated in FIG. 6, the first time interval setting part 50*a* sets the time interval between the first group and the adjacent first group to 5 μs or longer.

Due to this, the heat generated in the workpiece cools down in the period from the irradiation of the workpiece with the pulsed laser beams of the first group to the irradiation with the pulsed laser beams of the next first group. Therefore, an adverse effect on the device attributed to the heat can be prevented.

It is preferable that the number of pulsed laser beams that configure the first group be set by the first group setting part 48*a* in such a manner that heat generated due to irradiation with the pulsed laser beams of the first group results in a temperature equal to or less than such a temperature that the device is not adversely affected.

After the number of pulsed laser beams of the first group (six pulses), the time interval between the first groups (5 μs), and the time interval of the pulsed laser beams that configure the first group (15 ns) are set in the above-described manner, the first time interval setting part 50*a* inputs a signal to the multiple laser diodes LD at an interval of 15 ns by the pulse delay generator 56 and inputs the signal in such a manner that the time interval between the first groups becomes 5 μs (see FIG. 3).

Alternatively, the first time interval setting part 50*a* may apply a voltage to the multiple laser oscillators 46 at an interval of 15 ns by the delayed voltage instrument 58 and apply the voltage in such a manner that the time interval between the first groups becomes 5 μs (see FIG. 4).

The time interval between the first groups may be caused to become 5 μs by decimating a predetermined number of groups from multiple groups emitted in one second by the decimating part 52.

That is, the time interval between the first groups may be caused to become 5 μs by decimating the predetermined number of groups from the multiple groups emitted in one second by the decimating part 52 while inputting the signal to the multiple laser diodes LD at an interval of 15 ns through the pulse delay generator 56 or applying the voltage to the multiple laser oscillators 46 at an interval of 15 ns through the delayed voltage instrument 58. When the time interval between the first groups is 5 μs, the repetition frequency is 200 kHz.

By selecting the first mode and actuating the laser oscillation mechanism 38 as above, the pulsed laser beams in which the number of pulses of the first group is six and the pulse interval is 15 ns and the time interval between the first groups is 5 μs like those illustrated in FIG. 6 are generated.

These pulsed laser beams are focused by the beam condenser 40 after the output power thereof is adjusted as appropriate by the attenuator 54, and irradiation with them is carried out along the planned dividing line L of the workpiece. This can form the groove G while breaking the growing debris generated due to the irradiation with the pulsed laser beam by plasma.

The first mode can be carried out under the following processing conditions, for example.

Wavelength of pulsed laser beam: 355 nm
Average output power: 30 W
Repetition frequency of first group: 200 kHz
Configuration of first group: six pulsed laser beams
Power density of first group: 30 J/cm$^2$
Pulse width of first group: 75 ns (see FIG. 6)
Spot size of first group: 10 μm in the X-axis direction and 50 μm in the Y-axis direction
Overlapping rate between first groups: 50%
Feed rate: 1 m/s
Generation time of plasma: plasma is generated after 10 ns after laser irradiation (see FIG. 5)
Disappearance time of plasma: plasma disappears after 30 ns after laser irradiation (see FIG. 5)
Power density of one pulse: 5 J/cm$^2$
Pulse width of one pulse: 10 ps
Overlapping rate between pulses: 99.8%
Time interval between pulses: 15 ns (see FIG. 6)

Second Mode

With the workpiece in which a comparatively large amount of molten debris is generated when the workpiece is irradiated with the laser beam, the second mode is selected, and the grooves G are formed while generation of the molten debris is suppressed.

When the second mode is selected, the second group setting part 48*b* sets the number of pulsed laser beams of the second group with which irradiation is carried out by the time when the molten debris solidifies, on condition that irradiation with the pulsed laser beam is carried out in a time shorter than the time for which the molten debris is generated due to the irradiation of the workpiece with the pulsed laser beam. Furthermore, the second time interval setting part 50*b* sets the time required until heat generated in the workpiece due to irradiation with the pulsed laser beams of the second group cools down as the time interval between the second group and the adjacent second group, and sets the time interval of the pulsed laser beams that configure the second group.

The time interval (pulse interval) of the pulsed laser beams that configure the second group and the number of pulsed laser beams (the number of pulses) of the second group will be described. When the molten debris is generated after the elapse of a time t1 from irradiation of the workpiece with the pulsed laser beam and the molten debris solidifies after the elapse of a time t2, the second time interval setting part 50*b* sets a time interval (pulse interval) t3 of the pulsed laser beams of the second group in such a manner that a relation of t3<t1 is satisfied, and the second group setting part 48*b* sets the number n of pulsed laser beams (the number of pulses) of the second group as n=integer part of (t2/t3)+1.

As described above, it has been confirmed that the molten debris generated when the workpiece is irradiated with the pulsed laser beam is generated after the elapse of substantially 100 ns from the irradiation of the workpiece with the pulsed laser beam and solidifies after the elapse of substantially 500 ns.

Thus, with the time when the workpiece is irradiated with the first pulsed laser beam (first pulse) being a reference (0 s), the time t1 for which the molten debris is generated is set to 100 ns and the time t2 for which the molten debris solidifies is set to 500 ns. In this case, the second time interval setting part 50b sets the time interval (pulse interval) t3 of the pulsed laser beams of the second group to, for example, 50 ns. However, t3 is not limited to 50 ns, and it suffices for t3 to be a time shorter than the time t1 for which the molten debris is generated=100 ns.

When the second time interval setting part 50b sets the pulse interval t3 to 50 ns, the number n of pulsed laser beams (the number of pulses) of the second group is set as follows in the second group setting part 48b.

$$n = \text{integer part of } (t2/t3) + 1$$
$$= \text{integer part of } (500 \text{ ns}/50 \text{ ns}) + 1$$
$$= 10 + 1$$
$$= 11$$

In the above-described case, (t2/t3) is a combination of numerical values that allow division without residue. For example, when the second time interval setting part 50b sets t3 to 60 ns, the second group setting part 48b sets the number n of pulses as follows.

$$n = \text{integer part of } (t2/t3) + 1$$
$$= \text{integer part of } (500 \text{ ns}/60 \text{ ns}) + 1$$
$$= \text{integer part of } (8.333 \ldots) + 1$$
$$= 8 + 1$$
$$= 9$$

As above, in the second group setting part 48b, the number (n=11) of pulsed laser beams of the second group with which irradiation is carried out by the time (t2=500 ns) when the molten debris solidifies from irradiation with the first pulsed laser beam (first pulse) is set on condition that irradiation with the pulsed laser beam is carried out at a time interval (t3=50 ns) shorter than the time (t1=100 ns) for which the molten debris is generated due to the irradiation of the workpiece with the pulsed laser beam. This can suppress generation of the molten debris when the workpiece is irradiated with the pulsed laser beam.

In the second time interval setting part 50b, as in the first time interval setting part 50a, not only setting the time interval of the pulsed laser beams that configure the second group but also setting the time required until the heat generated in the workpiece due to irradiation with the pulsed laser beams of the second group cools down as the time interval between the second group and the adjacent second group (for example, 5 μs) is carried out.

After the number of pulsed laser beams of the second group (n=11), the time interval between the second groups (5 μs), and the time interval of the pulsed laser beams that configure the second group (t3=50 ns) are set in the above-described manner, the second time interval setting part 50b inputs a signal to the multiple laser diodes LD at an interval of 50 ns by the pulse delay generator 56 and inputs the signal in such a manner that the time interval between the second groups becomes 5 μs.

Alternatively, the second time interval setting part 50b may apply a voltage to the multiple laser oscillators 46 at an interval of 50 ns by the delayed voltage instrument 58 and apply the voltage in such a manner that the time interval between the second groups becomes 5 μs.

Similarly to the time interval between the first groups in the first mode, the time interval between the second groups may be caused to become 5 μs by decimating a predetermined number of groups from multiple groups emitted in one second by the decimating part 52. When the time interval between the second groups is 5 μs, the repetition frequency is 200 kHz.

By selecting the second mode and actuating the laser oscillation mechanism 38 as above, the pulsed laser beams in which the number n of pulses of the second group is 11 and the pulse interval t3 is 50 ns and the time interval between the second groups is 5 μs like those illustrated in FIG. 7 are generated. These pulsed laser beams are focused by the beam condenser 40 after the output power thereof is adjusted as appropriate by the attenuator 54, and irradiation with them is carried out along the planned dividing line L of the workpiece. This can form the groove G while suppressing generation of the molten debris.

The second mode can be carried out under the following processing conditions, for example.

Wavelength of pulsed laser beam: 355 nm
Average output power: 30 W
Repetition frequency of second group: 200 kHz
Configuration of second group: 11 pulsed laser beams
Power density of second group: 30 J/cm$^2$
Pulse width of second group: 500 ns (see FIG. 7)
Spot size of second group: 10 μm in the X-axis direction and 50 μm in the Y-axis direction
Overlapping rate between second groups: 50%
Feed rate: 1 m/s
Generation time t1 of molten debris: molten debris is generated after 100 ns after laser irradiation
Solidification time t2 of molten debris: molten debris solidifies after 500 ns after laser irradiation
Time interval t3 between pulses: 50 ns (see FIG. 7)
Power density of one pulse: 2.7 J/cm$^2$
Pulse width of one pulse: 10 ps
Overlapping rate between pulses: 99.5%

Third Mode

With the workpiece in which both the growing debris and the molten debris are generated in large amounts when the workpiece is irradiated with the laser beam, the third mode is selected, and the grooves G are formed while the growing debris is broken and generation of the molten debris is suppressed.

When the third mode is selected, the third group setting part 48c sets the number of pulsed laser beams of the third group with which irradiation is carried out by the time when the molten debris solidifies, on condition that irradiation with the next pulsed laser beam is carried out in the time that is a time shorter than the time for which the molten debris is generated due to the irradiation of the workpiece with the pulsed laser beam and is a time required until plasma generated from the workpiece due to the irradiation with the pulsed laser beam disappears to continue the plasma without interruption and break the growing debris. Further, the third time interval setting part 50c sets the time required until heat generated in the workpiece due to irradiation with the pulsed laser beams of the third group cools down as the time interval between the third group and the adjacent third group, and sets the time interval of the pulsed laser beams that configure the third group.

The time interval (pulse interval) of the pulsed laser beams that configure the third group and the number of pulsed laser beams (the number of pulses) of the third group will be described. When the molten debris is generated after the elapse of the time t1 from irradiation of the workpiece with the pulsed laser beam and the molten debris solidifies after the elapse of the time t2, the third time interval setting part 50c sets a time interval (pulse interval) T3 of the pulsed laser beams of the third group in such a manner that a relation of T3<t1 is satisfied and T3 is between a time t4 for which plasma is generated from the workpiece and a time t5 for which the plasma disappears, that is, a relationship of t4<T3<t5 is satisfied. Moreover, the third group setting part 48c sets the number N of pulsed laser beams (the number of pulses) of the third group as N=integer part of (t2/T3)+1.

As described above, it has been confirmed that the molten debris generated when the workpiece is irradiated with the pulsed laser beam is generated after the elapse of substantially 100 ns from the irradiation of the workpiece with the pulsed laser beam and solidifies after the elapse of substantially 500 ns. Further, in general, the plasma generated when the workpiece is irradiated with the pulsed laser beam is generated after the elapse of substantially 10 ns and disappears after the elapse of substantially 30 ns.

Thus, the respective times are set as follows with the time when the workpiece is irradiated with the first pulsed laser beam (first pulse) being the reference (0 s).
  time t1 for which the molten debris is generated=100 ns
  time t2 for which the molten debris solidifies=500 ns
  time t4 for which the plasma is generated=10 ns
  time t5 for which the plasma disappears=30 ns
In this case, the third time interval setting part 50c sets the time interval (pulse interval) T3 of the pulsed laser beams of the third group to, for example, 15 ns. T3=15 ns causes satisfaction of both of $$T3<t1(100 \text{ ns})$$

$$t4(10 \text{ ns})<T3<t5(30 \text{ ns}).$$

When the third time interval setting part 50c sets the pulse interval T3 to 15 ns, the number N of pulsed laser beams (the number of pulses) of the third group is set as follows in the third group setting part 48c.

$$N = \text{integer part of } (t2/T3) + 1$$
$$= \text{integer part of } (500 \text{ ns}/15 \text{ ns}) + 1$$
$$= \text{integer part of } (33.333 \ldots) + 1$$
$$= 33 + 1$$
$$= 34$$

As above, in the third group setting part 48c, the number (N=34) of pulsed laser beams of the third group with which irradiation is carried out by the time (t2=500 ns) when the molten debris solidifies from irradiation with the first pulsed laser beam (first pulse) is set on condition that irradiation with the next pulsed laser beam is carried out in the time (t5=30 ns) that is a time shorter than the time (t1=100 ns) for which the molten debris is generated due to the irradiation of the workpiece with the pulsed laser beam and is the time required until the plasma generated from the workpiece due to the irradiation with the pulsed laser beam disappears to continue the plasma without interruption and break the growing debris. Due to this, when the workpiece is irradiated with the pulsed laser beams, the growing debris generated due to the irradiation with the pulsed laser beam can be broken by the plasma, and generation of the molten debris can be suppressed.

In the third time interval setting part 50c, as in the first and second time interval setting parts 50a and 50b, not only setting the time interval of the pulsed laser beams that configure the third group but also setting the time required until the heat generated in the workpiece due to irradiation with the pulsed laser beams of the third group cools down as the time interval between the third group and the adjacent third group (for example, 5 μs) is carried out.

After the number of pulsed laser beams of the third group (N=34), the time interval between the third groups (5 μs), and the time interval of the pulsed laser beams that configure the third group (T3=15 ns) are set in the above-described manner, the third time interval setting part 50c inputs a signal to the multiple laser diodes LD at an interval of 15 ns by the pulse delay generator 56 and inputs the signal in such a manner that the time interval between the third groups becomes 5 μs.

Alternatively, the third time interval setting part 50c may apply a voltage to the multiple laser oscillators 46 at an interval of 15 ns by the delayed voltage instrument 58 and apply the voltage in such a manner that the time interval between the third groups becomes 5 μs.

Similarly to the time interval between the first groups in the first mode, the time interval between the third groups may be caused to become 5 μs by decimating a predetermined number of groups from multiple groups emitted in one second by the decimating part 52. When the time interval between the third groups is 5 μs, the repetition frequency is 200 kHz.

By selecting the third mode and actuating the laser oscillation mechanism 38 as above, the pulsed laser beams in which the number N of pulses of the third group is 34 and the pulse interval T3 is 15 ns and the time interval between the third groups is 5 μs like those illustrated in FIG. 8 are generated. These pulsed laser beams are focused by the beam condenser 40 after the output power thereof is adjusted as appropriate by the attenuator 54, and irradiation with them is carried out along the planned dividing line L of the workpiece. This can form the groove G while breaking the growing debris generated due to the irradiation with the pulsed laser beam by plasma and suppressing generation of the molten debris.

The third mode can be carried out under the following processing conditions, for example.
  Wavelength of pulsed laser beam: 355 nm
  Average output power: 60 W
  Repetition frequency of third group: 200 kHz
  Configuration of third group: 34 pulsed laser beams
  Power density of third group: 60 J/cm$^2$
  Pulse width of third group: 495 ns=T3×(34−1)
  Spot size of third group: 10 μm in the X-axis direction and 50 μm in the Y-axis direction
  Overlapping rate between third groups: 50%
  Feed rate: 1 m/s
  Generation time t1 of molten debris: molten debris is generated after 100 ns after laser irradiation Solidification time t2 of molten debris: molten debris solidifies after 500 ns after laser irradiation Time interval T3 between pulses: 15 ns (see FIG. 8)

Figure 5:
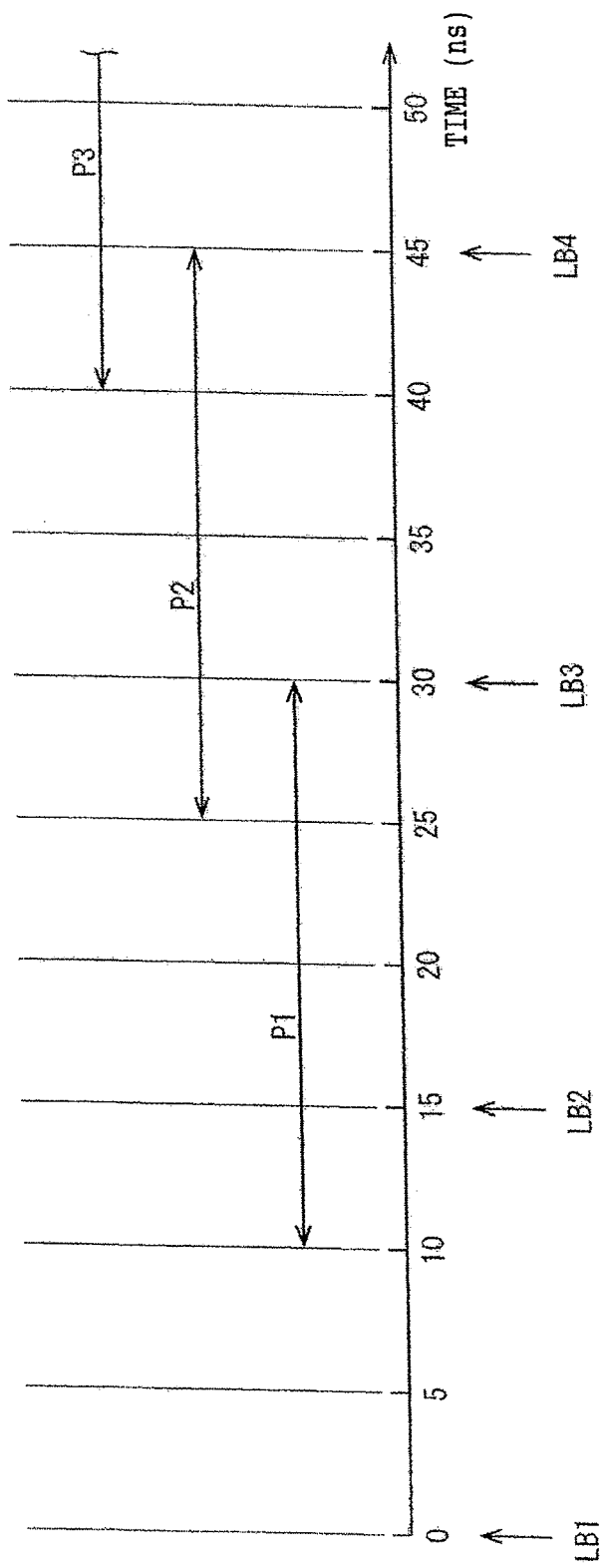
FIG. 5 is a schematic diagram illustrating a generation time and a disappearance time of plasma generated due to irradiation with a pulsed laser beam.

Generation time t4 of plasma: plasma is generated after 10 ns after laser irradiation (see FIG. 5)

Disappearance time t5 of plasma: plasma disappears after 30 ns after laser irradiation (see FIG. 5)

Power density of one pulse: 1.7 J/cm$^2$

Pulse width of one pulse: 10 ps

Overlapping rate between pulses: 99.8%

The configuration of the present embodiment is as above. In the laser processing apparatus 2 of the present embodiment, by selecting the first mode, the groove G can be formed while the growing debris generated due to irradiation with the pulsed laser beam is broken by plasma. Further, by selecting the second mode, the groove G can be formed while generation of the molten debris is suppressed. Moreover, by selecting the third mode, the groove G can be formed while the growing debris is broken by plasma and generation of the molten debris is suppressed. Therefore, irradiation with the laser beam does not need to be carried out anew in order to remove the debris after the workpiece is irradiated with the laser beam to form the groove. Thus, the productivity can be improved.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:

a chuck table that holds a workpiece;

a laser beam irradiation unit that irradiates the workpiece held by the chuck table with a pulsed laser beam; and a feed mechanism that carries out processing feed of the chuck table and the laser beam irradiation unit relatively with each other, wherein the laser beam irradiation unit includes a laser oscillation mechanism that emits the pulsed laser beam and a beam condenser that condenses the pulsed laser beam emitted by the laser oscillation mechanism and irradiates the workpiece held by the chuck table with the pulsed laser beam, the laser oscillation mechanism includes:

a first mode having a first group setting part that sets the number of pulsed laser beams with which irradiation with the next pulsed laser beam is carried out in a time required until plasma generated from the workpiece due to the irradiation of the workpiece with the pulsed laser beam disappears to continue the plasma without interruption and break growing debris and makes the pulsed laser beams into a first group, and a first time interval setting part that sets a time required until heat generated due to irradiation with the pulsed laser beams of the first group cools down as a time interval between the first group and the adjacent first group and sets a time interval of the pulsed laser beams that configure the first group, a second mode having a second group setting part that sets the number of pulsed laser beams with which irradiation is carried out by a time when molten debris solidifies, on condition that irradiation with the pulsed laser beam is carried out in a time shorter than a time for which the molten debris is generated due to the irradiation of the workpiece with the pulsed laser beam and makes the pulsed laser beams into a second group, and a second time interval setting part that sets a time required until heat generated due to irradiation with the pulsed laser beams of the second group cools down as a time interval between the second group and the adjacent second group and sets a time interval of the pulsed laser beams that configure the second group, a third mode having a third group setting part that sets the number of pulsed laser beams with which irradiation is carried out by the time when the molten debris solidifies, on condition that irradiation with the next pulsed laser beam is carried out in a time that is a time shorter than the time for which the molten debris is generated due to the irradiation of the workpiece with the pulsed laser beam and is the time required until the plasma generated from the workpiece due to the irradiation with the pulsed laser beam disappears to continue the plasma without interruption and break the growing debris and makes the pulsed laser beams into a third group, and a third time interval setting part that sets a time required until heat generated due to irradiation with the pulsed laser beams of the third group cools down as a time interval between the third group and the adjacent third group and sets a time interval of the pulsed laser beams that configure the third group, the laser oscillation mechanism further includes a selecting part that selects any of the first mode, the second mode, and the third mode, the laser oscillation mechanism sets a repetition frequency with the first group being one unit in the first mode, the laser oscillation mechanism sets a repetition frequency with the second group being one unit in the second mode, and the laser oscillation mechanism sets a repetition frequency with the third group being one unit in the third mode.

2. The laser processing apparatus according to claim 1, wherein the laser oscillation mechanism includes a plurality of laser diodes that emit the pulsed laser beam, the first group is set by the pulsed laser beams emitted by the plurality of laser diodes in the first group setting part, the second group is set by the pulsed laser beams emitted by the plurality of laser diodes in the second group setting part, the third group is set by the pulsed laser beams emitted by the plurality of laser diodes in the third group setting part, in the first time interval setting part, a signal is input to the plurality of laser diodes at a desired time interval by a pulse delay generator, and the signal is input in such a manner that the time required until the heat generated due to the irradiation with the pulsed laser beams of the first group cools down is set as the time interval between the first group and the adjacent first group, in the second time interval setting part, a signal is input to the plurality of laser diodes at a desired time interval by the pulse delay generator, and the signal is input in such a manner that the time required until the heat generated due to the irradiation with the pulsed laser beams of the second group cools down is set as the time interval between the second group and the adjacent second group, and in the third time interval setting part, a signal is input to the plurality of laser diodes at a desired time interval by the pulse delay generator, and the signal is input in such a manner that the time required until the heat generated due to the irradiation with the pulsed laser beams of the third group cools down is set as the time interval between the third group and the adjacent third group.

3. The laser processing apparatus according to claim 1, wherein
the laser oscillation mechanism includes a plurality of laser oscillators that emit the pulsed laser beam,
the first group is set by the pulsed laser beams emitted by the plurality of laser oscillators in the first group setting part,
the second group is set by the pulsed laser beams emitted by the plurality of laser oscillators in the second group setting part,
the third group is set by the pulsed laser beams emitted by the plurality of laser oscillators in the third group setting part,
in the first time interval setting part, a voltage is applied to the plurality of laser oscillators at a desired time interval by a delayed voltage instrument, and the voltage is applied in such a manner that the time required until the heat generated due to the irradiation with the pulsed laser beams of the first group cools down is set as the time interval between the first group and the adjacent first group,
in the second time interval setting part, a voltage is applied to the plurality of laser oscillators at a desired time interval by the delayed voltage instrument, and the voltage is applied in such a manner that the time required until the heat generated due to the irradiation with the pulsed laser beams of the second group cools down is set as the time interval between the second group and the adjacent second group, and
in the third time interval setting part, a voltage is applied to the plurality of laser oscillators at a desired time interval by the delayed voltage instrument, and the voltage is applied in such a manner that the time required until the heat generated due to the irradiation with the pulsed laser beams of the third group cools down is set as the time interval between the third group and the adjacent third group.

4. The laser processing apparatus according to claim 1, wherein
a repetition frequency is set by decimating a predetermined number of the first groups from a plurality of the first groups emitted in one second in the first mode,
a repetition frequency is set by decimating a predetermined number of the second groups from a plurality of the second groups emitted in one second in the second mode, and
a repetition frequency is set by decimating a predetermined number of the third groups from a plurality of the third groups emitted in one second in the third mode.

* * * * *